United States Patent
Tseng

(10) Patent No.: US 7,158,113 B2
(45) Date of Patent: Jan. 2, 2007

(54) INTEGRATED DIGITAL PLATFORM

(76) Inventor: Hsin-Tung Tseng, 3F, No. 22, Lane 65, Wen Hua S Rd., San-Chung City, Taipei Hsien (TW) 24142

( * ) Notice: Subject to any disclaimer, the term of this patent is extended or adjusted under 35 U.S.C. 154(b) by 510 days.

(21) Appl. No.: 10/725,550

(22) Filed: Dec. 3, 2003

(65) Prior Publication Data
US 2005/0122280 A1 Jun. 9, 2005

(51) Int. Cl.
*G09G 5/00* (2006.01)
*G09B 11/00* (2006.01)
(52) U.S. Cl. ...................................... 345/156; 345/173
(58) Field of Classification Search ................ 345/156, 345/173, 179, 174, 175, 180; 434/81, 308
See application file for complete search history.

(56) References Cited

U.S. PATENT DOCUMENTS

2004/0239640 A1* 12/2004 Lahade et al. .............. 345/173

* cited by examiner

*Primary Examiner*—Dennis-Doon Chow
(74) *Attorney, Agent, or Firm*—Rosenberg, Klein & Lee

(57) ABSTRACT

An integrated digital platform includes a digital display unit adapted to display visual images, with a broadband device at the top side thereof, two glass whiteboards arranged at left and right sides of the digital display unit, an electron beam track extended along the digital display unit and the glass whiteboards at the top side, an electron beam set in the electron beam track, a concealable inner layer provided at an inner side of one the glass whiteboard and accommodating an audio video input/output device and a data processing/storage device, and a multi-channel speaker mounted on the integrated digital platform and the lecture environment.

12 Claims, 6 Drawing Sheets

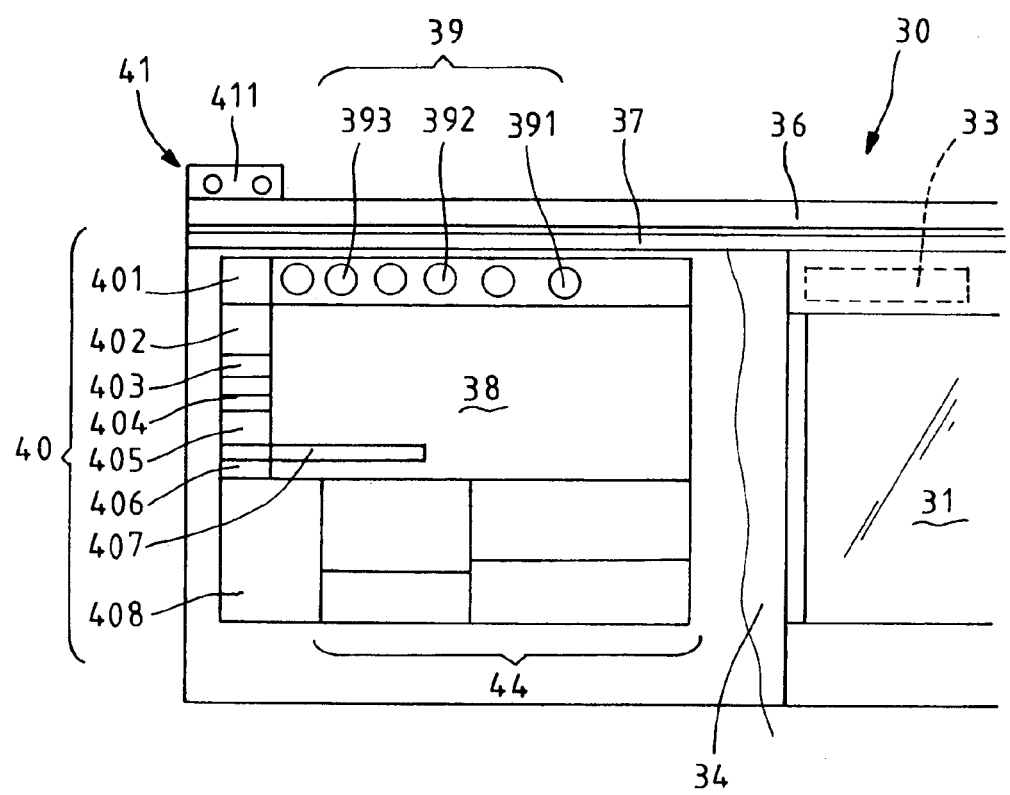
F I G. 5

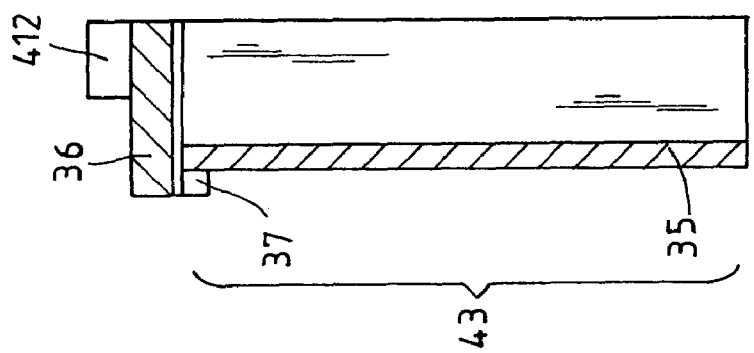
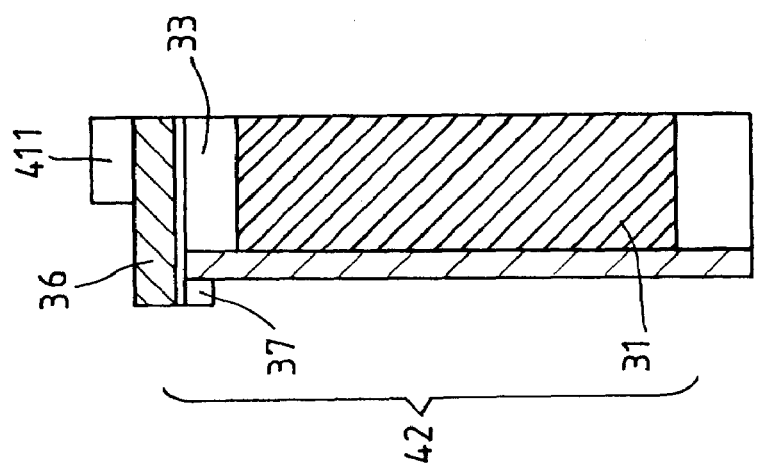
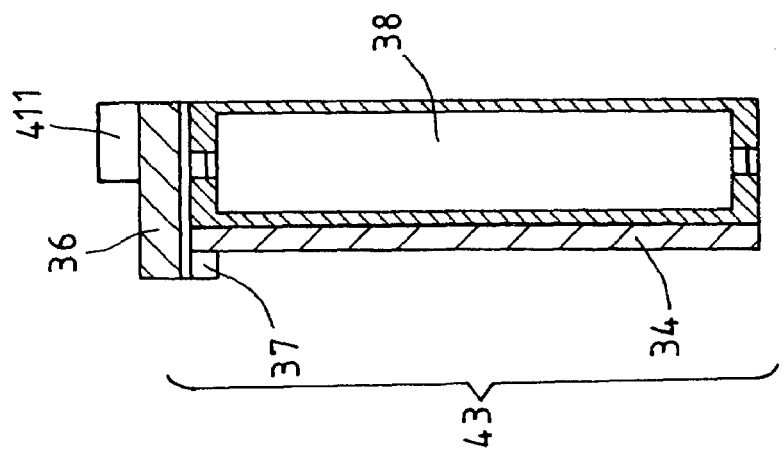

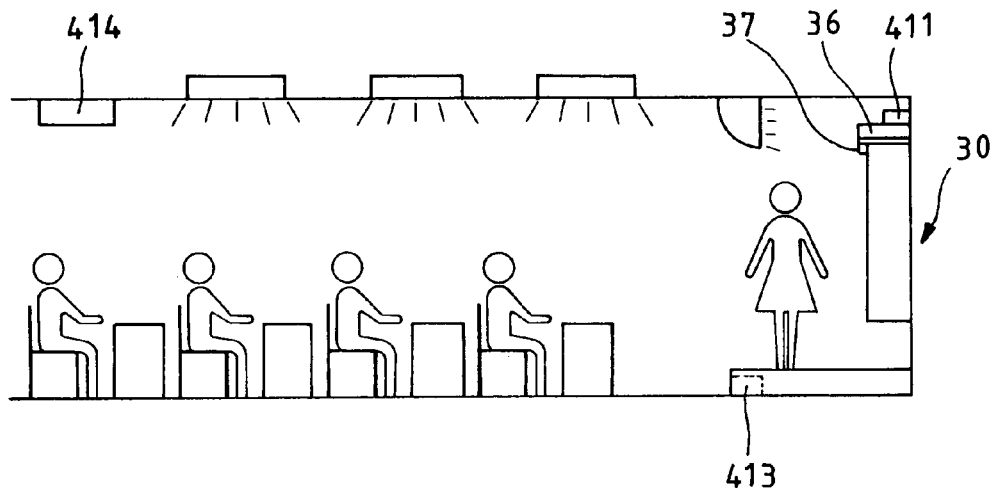
F I G. 9
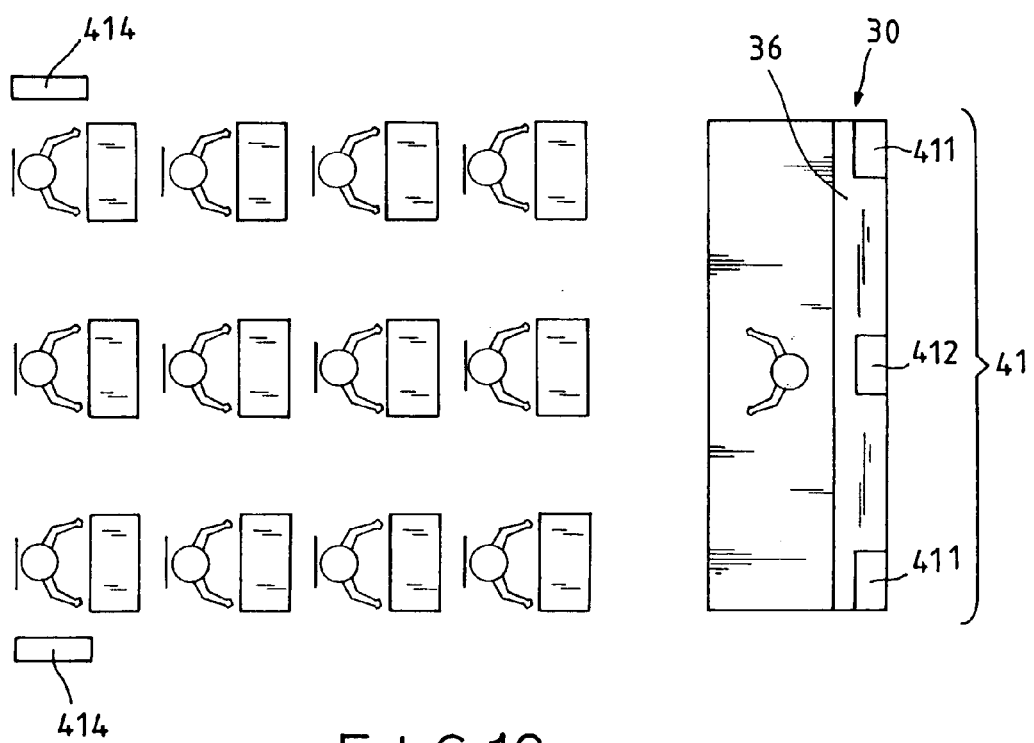
F I G. 10

INTEGRATED DIGITAL PLATFORM

BACKGROUND OF THE INVENTION

1. Field of the Invention

The present invention relates to educational systems and, more particularly, to an integrated digital platform which incorporates a self-illuminating broad digital display unit with an electron beam and two glass whiteboards, enabling the electron beam to be moved along an electron beam track, and keeping all connecting lines from sight. The integrated digital platform automatically records the content (including digital data, voice, hand-written content) that has been conveyed and stores this content in the form of an electronic file, which can then be sent to the e-mail addresses of each student. Hereby in this document, the term 'integrated digital platform' exclusively refers to the present invention.

2. Description of the Related Art

FIGS. 1 and 2 show a typical tutoring status in a lecture environment. As illustrated, a whiteboard unit 11 is placed at the front wall of the lecture environment. A roll-up screen 12 is suspended in front of the whiteboard unit 11. A projector 13 is positioned on the table in front of the screen 12 and connected to a notebook computer 14. A lamp 17 is mounted on the ceiling and adapted to illuminate the whiteboard unit 11. During lecturing, the teacher 15 must stand out of the projected light from the projector 13, and they will frequently operate the notebook computer 14 and/or the projector 13. Before using the projector 13, the teacher must turn off the light at the front of the room 17 for optimal viewing quality of the images on the screen 12. Further, because the cables of the projector 13 and the notebook computer 14 are not integrated as a fixture in the lecture environment, they tend to be tripped over and thus stretched accidentally, moving the projector 13 and the notebook computer 14 out of place or falling to the floor.

FIG. 3 illustrates an interactive display platform according to the prior art. The interactive display platform is comprised of a specifically designed whiteboard 20, a suspension arm 22 installed at the top side of the whiteboard 20, a projector 21 carried on the suspension arm 22, and an electron beam (not shown). This design of an interactive display platform is still not functionally satisfactory. According to this design, the whiteboard 20 can be used as a projection board or an electronic whiteboard. However, when the whiteboard is used as an electronic whiteboard, the projector 21 must be turned off.

SUMMARY OF THE INVENTION

The present invention has been a reaction to these formidable hindrances within a typical lecture environment. The present invention, an integrated digital platform, automatically records the content (including digital data, voice, and hand-written content) and stores this content in the form of an electronic file, so that people that are not present in the immediate lecture environment can attend the lecture from a remote site via the internet. It is another object of the present invention to provide a greatly improved educational atmosphere and learning potential.

To achieve these and other objects of the present invention, the integrated digital platform is comprised of a digital display unit adapted to display images, with a broadband device fixed at the top, two glass whiteboards arranged at left and right sides of the digital display unit, an electron beam track extended along the digital display unit, an electron beam track extended along the top of the digital display unit and the glass whiteboards, an electron beam that is set in the electron beam track, a concealable inner layer provided inside of one the glass whiteboards which facilitates the accommodation of an audio video input/output device and a data processing/storage device, and a multi-channel speaker mounted in the integrated digital platform and the lecture environment.

BRIEF DESCRIPTION OF THE DRAWINGS

FIG. 5 is an enlarged view of the left part of FIG. 4 which in this example is the side that has the multi-purposed concealable area.

FIG. 6 is a cross section view taken along the line that connects 6—6 at the top and bottom of FIG. 4.

FIG. 7 is a cross section view taken along the line that connects 7—7 at the top and bottom of FIG. 4.

FIG. 8 is a cross section view taken along the line that connects 8—8 at the top and bottom of FIG. 4.

FIG. 9 is a side view showing an example application of the present invention in a lecture environment.

FIG. 10 is a top view of FIG. 9

DETAILED DESCRIPTION OF THE PREFERRED EMBODIMENT

Figure 1:
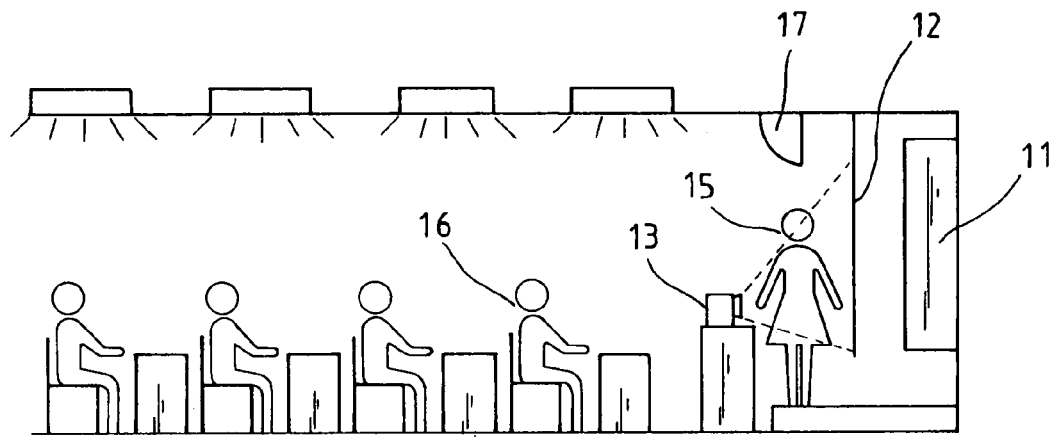
FIG. 1 is a schematic drawing showing the arrangement of a whiteboard unit, a computer, and a projector set in a classroom according to the prior art.
Figure 2:
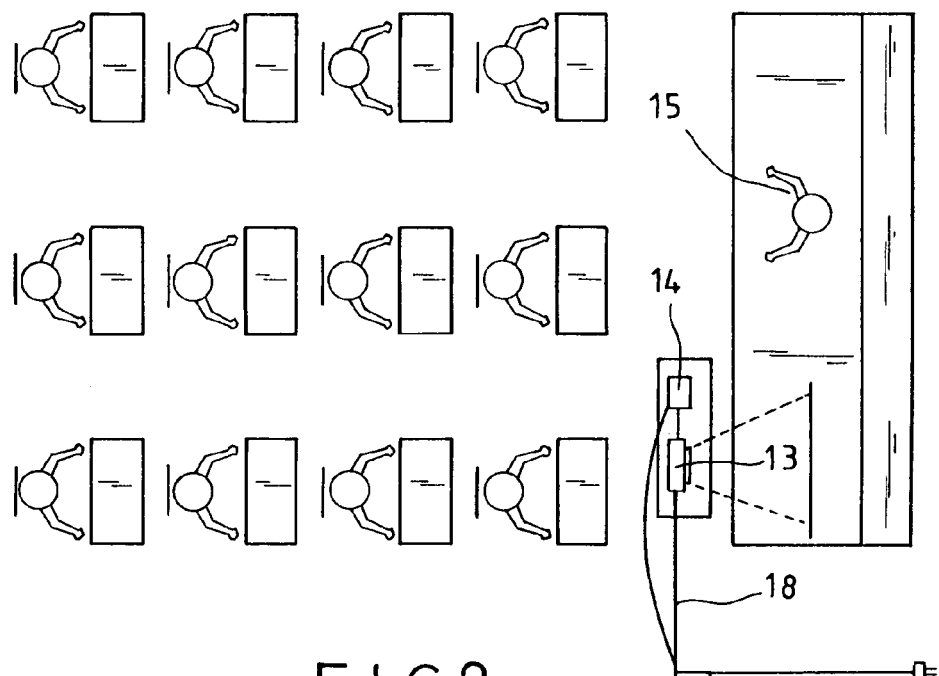
FIG. 2 is a schematic top view of FIG. 1.
Figure 3:
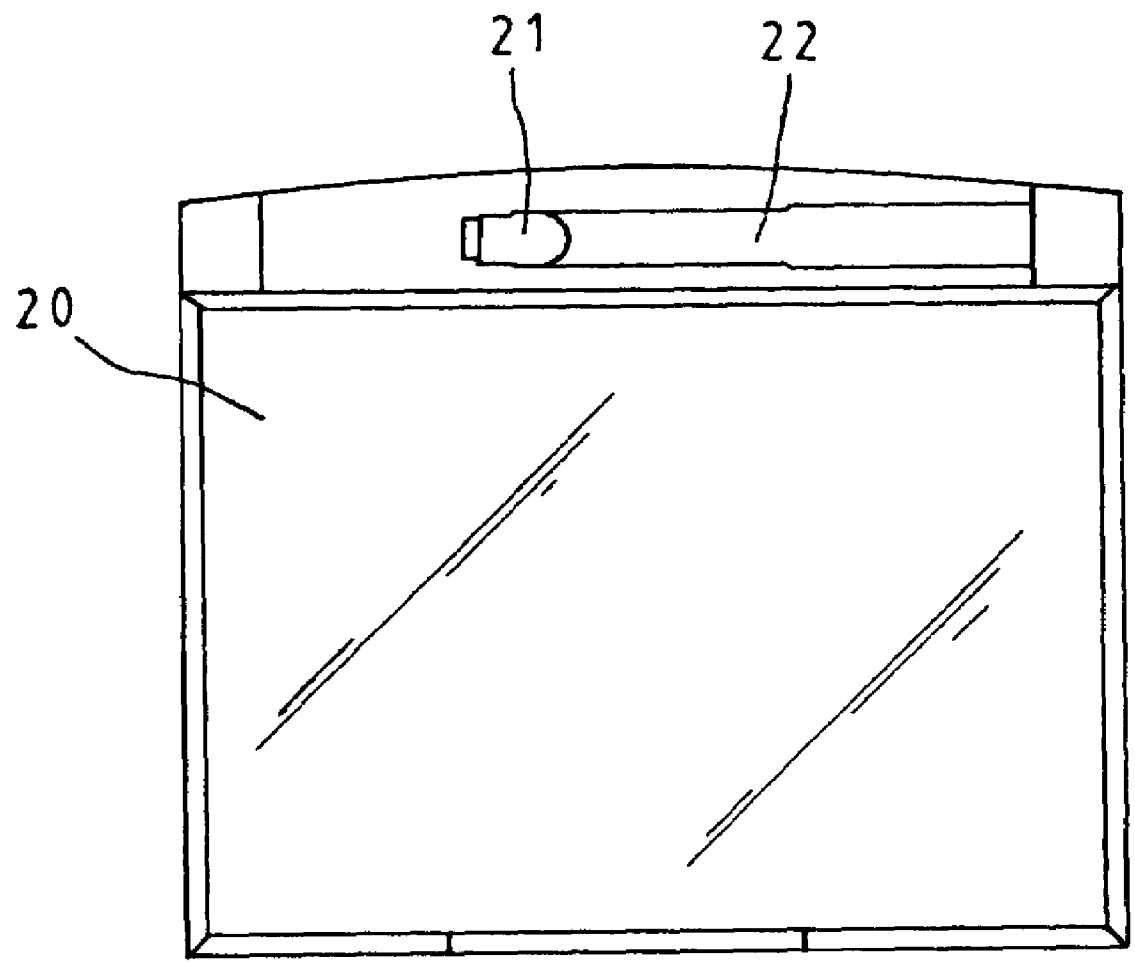
FIG. 3 illustrates an interactive display platform according to the prior art.
Figure 4:
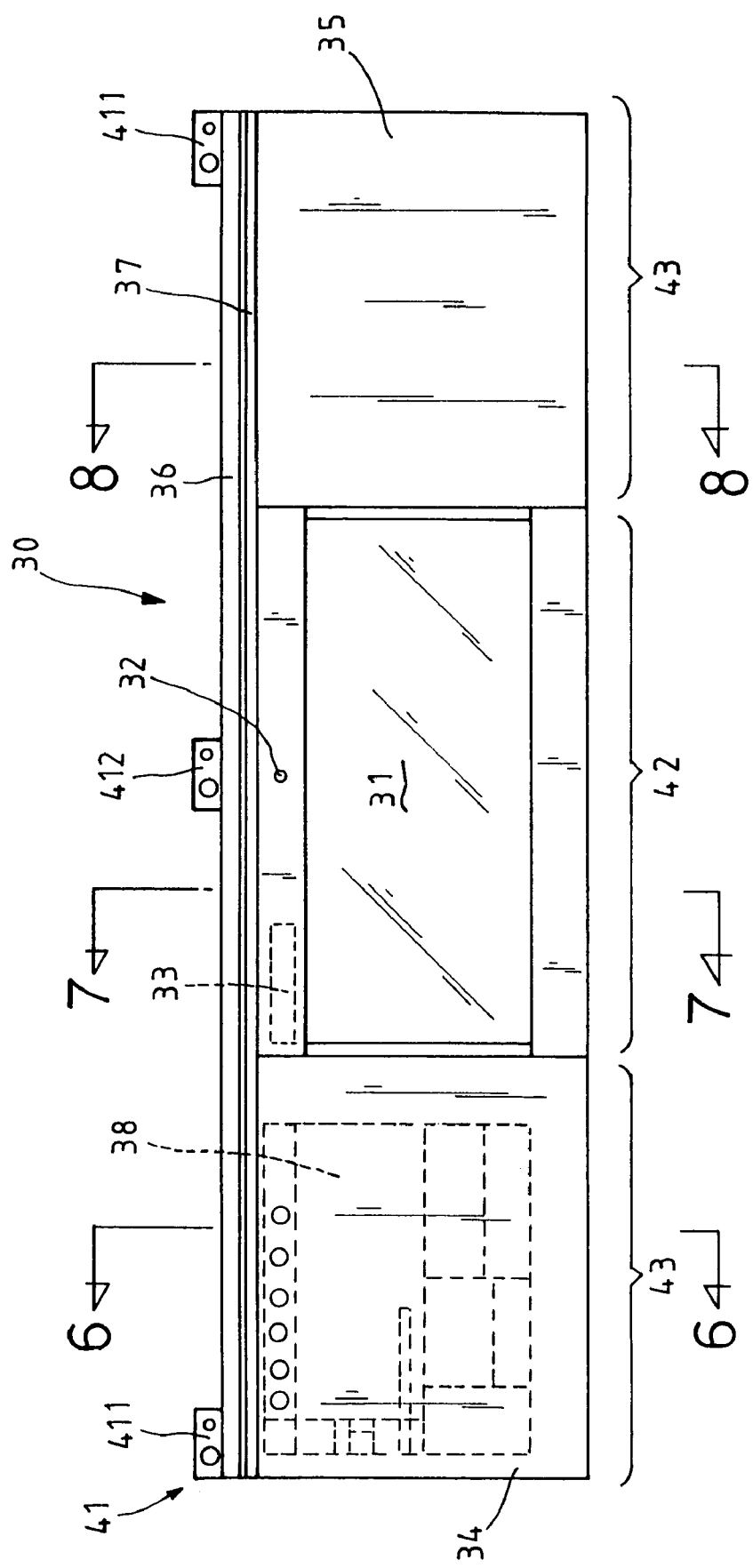
FIG. 4 is a schematic assembly view of the present invention, an integrated digital platform.

Referring to FIGS. 4 and 8, the present invention is shown with the installation of a digital display unit 31, left and right glass whiteboards 34 and 35, an electron beam track 36, an electron beam 37, a concealable inner layer 38, and a multi-channel speaker set 41.

The digital display unit 31 is formed of a self-illuminating broad flat-panel display, for example, a PDP (plasma display panel) or back projection device or a TFT-LCD (Thin Film Transistor-Liquid Crystal Display), and adapted to display visual images, having an image sensor, for example, a CCD (charge coupled device) 32 and a broadband device 33 situated at the top. The broadband device 33 is comprised of a broadband router and a wireless base station.

The left and right glass whiteboards 34 and 35 are arranged to the left and right of the digital display unit 31.

The electron beam track 36 extends along the top of the digital display unit 3 land the glass whiteboards 34 and 35.

The electron beam 37 is set in the electron beam track 36, and is free to be moved along the track.

The concealable inner layer 38 is inside of one glass whiteboards (in this case, 34), and adapted to accommodate an audio video input/output device 39 and a data processing/storage device 40.

The multi-channel speaker set 41 is set in the integrated digital platform 30 and the lecture environment.

The aforesaid digital display unit 31and electron beam 37 form an electronic digital image display and recording educational board assembly 42. The left and right whiteboards 34 and 35 and the electron beam form an electronic whiteboard assembly 43.

Further, the construction of the electronic digital image display 31, recording educational board assembly 42, and the electronic whiteboard assembly 43 allow easy position exchange when desired.

The electron beam track 36 simultaneously works as an antenna for the broadband wireless base station.

The audio video input/output device 39 in the concealable inner layer 38 is comprised of a wireless microphone 391, a multi-channel speaker control 392, and an audio video player 393.

The aforesaid data processing/storage device 40 is a combination of a printer server 401, a CD read-write device 402, a data storage device 403, a network data storage device 404, a USB (universal serial bus) terminal 405, a digital IC (integrated circuit) card input device 406, a microprocessor circuit board 407, and a notebook computer connector 408.

The concealable inner layer 38 further has a storage space 44 adapted to receive a variety of accessories including whiteboard markers, eraser, a mouse, a wireless keyboard, a joystick, and other similar applications.

The aforesaid audio video input/output device 39, data processing/storage device 40, and other digital platform peripheral tools are intended for or included with the known devices, and no further detailed description in this regard is necessary.

The aforesaid multi-channel speaker set 41 is comprised of left and right front speakers 411 bilaterally installed at the top of the integrated digital platform 30 with an intermediate speaker 412 also positioned at the top of the integrated digital platform 30 centered between the left and right front speakers 411. FIGS. 9 and 10 show a woofer 413 positioned at the bottom of the integrated digital platform 30, and the left and right rear speakers 414 are bilaterally positioned at a remote plate away from the integrated digital platform 30.

Based on the aforesaid technical features, the invention achieves the following functions and advantages.

1. The integrated digital platform 30 incorporates an electron beam with educational digital display hardware and glass whiteboards, enabling the electron beam to be moved freely along its track. This integrated digital platform 30 provides an electronic digital image display with the recording educational board assembly 42 and an electronic whiteboard assembly 43 that do not interfere with each other during tutoring. The integrated digital platform 30 automatically records the content (including digital data, voice, hand-written) that has been conveyed and stores this content in the form of an electronic file, which can then be sent to the e-mail addresses of each student via the data processing/storage device 40 in the concealable inner layer 38.

2. The CCD (charge coupled device) 32 and the broadband device 33 provide a wireless broadband on-line environment, enabling students to attend the class through the Internet, i.e. the integrated digital platform 30 allows interactive discussions and distance learning, and incorporates video conference function with educational training functionality for convenient and practical use, expanding the potential types of dynamics such as a multi-lecturer presentation.

3. The invention uses a self-illuminating broad flat-panel display for video output without causing damage to the students' eyes.

4. The invention incorporates data storage input devices and interfaces, keeping all connecting lines concealed in the integrated digital platform 30. Therefore, the whole system of the present invention is an esthetically pleasing addition to a lecture environment.

A prototype of integrated digital platform has been constructed with the features of FIGS. 4~10. The integrated digital platforms functions smoothly and provide all of the features discussed earlier.

Although a particular constitution of the invention has been described in detail for purposes of illustration, various modifications and enhancements may be made without departing from the purpose and scope of the invention. Accordingly, the invention is not to be limited except as by the appended claims.

What the invention claimed is:

1. An integrated digital platform comprising:
   a digital display unit adapted to display visual images, said digital display unit containing a broadband device that is integrated at the top side thereof;
   two glass whiteboards arranged at left and right sides of said digital display unit;
   an electron beam track extended along said digital display unit and said glass whiteboards at a top side;
   an electron beam set in said electron beam track;
   a concealable inner layer provided within the inside of one of the said glass whiteboards and accommodating an audio video input/output device and a data processing/storage device; and
   a multi-channel speaker set mounted in said integrated digital platform and a lecture environment.

2. The integrated digital platform as claimed in claim 1, wherein said digital display unit is comprised of a PDP (plasma display panel).

3. The integrated digital platform as claimed in claim 1, wherein said digital display unit is comprised of a back projection device.

4. The integrated digital platform as claimed in claim 1, wherein said digital display unit is comprised of a TFT-LCD (Thin Film Transistor-Liquid Crystal Display).

5. The integrated digital platform as claimed in claim 1, wherein said broadband device is comprised of a broadband router and a broadband wireless base station.

6. The integrated digital platform as claimed in claim 1, wherein said aforesaid digital display unit and said electron beam form an electronic digital image display with a recording educational board assembly; said whiteboards and said electron beam form an electronic whiteboard assembly.

7. The integrated digital platform as claimed in claim 6, wherein said electronic digital image display, said recording educational board assembly, and said electronic whiteboard assembly exist in the same facility, and are respectively made in the form of a fixture on the premises.

8. The integrated digital platform as claimed in claim 1, wherein said audio video input/output device is comprised of a wireless microphone, a digital speaker control, and an audio video player.

9. The integrated digital platform as claimed in claim 1, wherein said data processing/storage device acts as a printer server, a CD read-write device, a data storage device, a network data storage device, a USB (universal serial bus) terminal, a digital IC (integrated circuit) card input device, a microprocessor circuit board, and a notebook computer connector.

10. The integrated digital platform as claimed in claim 1, wherein said multi-channel speaker set consists of left and right front speakers bilaterally positioned at the top of said integrated digital platform, an intermediate speaker centered between said left and right front speakers at the top of said integrated digital platform, a woofer at the bottom of said integrated digital platform, and left and right rear speakers bilaterally arranged at a remote plate away from said integrated digital platform.

11. The integrated digital platform as claimed in claim 1, wherein said concealable inner layer provides utility and peripheral storage.

12. The integrated digital platform as claimed in claim 1, wherein said digital display unit further includes an image sensor formed of a CCD (charge coupled device).

* * * * *